US005435809A

United States Patent [19]
Holst et al.

[11] Patent Number: 5,435,809
[45] Date of Patent: Jul. 25, 1995

[54] METHOD OF OBTAINING COLOR EFFECTS ON FABRIC OR GARMENTS USING FOAM CARRIERS AND CELLULASE ENZYMES

[75] Inventors: L. Thomas Holst, Charlotte, N.C.; Casey Bownds, Littlefield, Tex.; Richard Craven, Fort Mill, S.C.; Robert Waddell, Charlotte, N.C.

[73] Assignee: Dexter Chemical Corp., Bronx, N.Y.

[21] Appl. No.: 70,019

[22] Filed: May 28, 1993

Related U.S. Application Data

[63] Continuation of Ser. No. 667,814, Mar. 12, 1991, abandoned.

[51] Int. Cl.⁶ .............................................. C12S 11/00

[52] U.S. Cl. .......................................... 8/401; 8/477; 8/116.1; 8/159; 435/263

[58] Field of Search ................ 8/401, 116.1, 477, 159; 435/263; 252/174.12, DIG. 12

[56] References Cited

U.S. PATENT DOCUMENTS

| | | | |
|---|---|---|---|
| 4,435,307 | 3/1984 | Barbesgaard et al. | 252/174.12 |
| 4,443,355 | 4/1984 | Murata et al. | 252/174.12 |
| 4,479,881 | 10/1984 | Tai | 252/8.8 |
| 4,575,887 | 3/1986 | Viramontes | 8/158 |
| 4,661,289 | 4/1987 | Parslow et al. | 252/547 |
| 4,738,682 | 4/1988 | Boegh et al. | 8/401 |
| 4,816,033 | 3/1989 | Hoffer et al. | 8/158 |
| 4,832,864 | 5/1989 | Olson | 252/174.12 |
| 4,912,056 | 3/1990 | Olson | 435/263 |
| 5,006,126 | 4/1991 | Olson et al. | 8/401 |
| 5,082,468 | 1/1992 | Hopkins | 8/477 |

FOREIGN PATENT DOCUMENTS 1-040667 2/1989 Japan .

*Primary Examiner*—Paul Lieberman
*Assistant Examiner*—Caroline L. Dusheck
*Attorney, Agent, or Firm*—Curtis Morris & Safford; Barry Evans

[57] ABSTRACT

A method for the treatment of denim fabrics or garments to achieve a worn or distressed look wherein treatment comprises contacting a plurality of denim fabrics or garments with an effective amount of a foam composition which contains an effective amount of a cellulase enzyme. The enzyme is capable of altering the color depth of the dye in the fabric materials. The garments or fabrics are vigorously tumbled so that they repeatedly contact and rub against one another so that abrasive rubbing contact between the garments or fabrics is ensured, which imparts a worn or distressed look to the fabrics or garments.

14 Claims, No Drawings

METHOD OF OBTAINING COLOR EFFECTS ON FABRIC OR GARMENTS USING FOAM CARRIERS AND CELLULASE ENZYMES

This application is a continuation of application Ser. No. 07/667,814, filed Mar. 12, 1991, now abandoned.

BACKGROUND OF THE INVENTION

This invention relates to methods for obtaining a worn, distressed bleached appearance in denim fabric or garments. More particularly, this invention relates to improved methods for foam treatment of denim fabrics or garments in order to obtain a variety of worn, lived-in appearances known, for example, as "the stone-washed look." Even more particularly, this invention relates to an effective, inexpensive method for using foams containing cellulase enzymes to create a variety of coloristic and worn appearances on denim fabric and garments.

There has arisen in recent years an industry related to the laundering industry, known as "stonewashing." Stonewashing is the term used to describe methods for imparting a soft, worn, faded look to new clothes, in particular to denim jeans. Consumers will pay a significant premium for clothes having a soft, worn look. Accordingly, a number of methods have been developed for washing new garments and fabrics which cause them to have the desired worn feel and appearance.

Among the prior art methods employed for stonewashing are those wherein large pumice stones, i.e., stones two to four inches or more in diameter, are used in a washing machine. These large stones circulate with the garments during the wash cycle and abrade and soften the garments. The main problems with the method are that the stones break, and collide with the washing cylinder during agitation, thereby causing damage to the cylinder and to the fabric or garments. Sharp edges and points formed when the stones break cause damage to fabric or garments, and damage is also caused when a portion of fabric or a garment is caught between two pumice stones, or between a stone and the washing cylinder. Consequently, although this procedure wears and abrades the fabric or garments treated and produces the desired appearance, it also weakens them and shortens their life expectancy, and often damages them to such an extent that they are unsuitable for sale. Still other disadvantages of the pumice stone method are the time and labor required to remove the stones from the washing machine after each cycle, and the risk of injury to workers handling the sharp stones.

In a modified pumice stone method developed with the aim of reducing the wear and tear on fabric and garments during washing with pumice stone, the pumice stones are soaked in sodium hypochlorite, potassium permanganate or other bleaching agent prior to the wash cycle. U.S. Pat. No. 4,816,033 describes an improved method for using pumice stones wherein the stones are impregnated with potassium permanganate. This method results in fabric or garments having the desired worn, soft, "whitewashed" appearance, with much less wear and tear on the fabric or garments. However, during the washing process, the bleach reacts with the pumice, resulting in a mud-like byproduct which is not soluble in water, and repeated rewashings of the treated fabric or garments are required to remove the insoluble byproduct. The formation of any byproduct which is insoluble in water also raises environmental concerns relating to the difficulties of disposal.

A second prior art method of stonewashing involves abrasion of the wash cylinder with abrasive materials such as volcanic rock. The rough, abraded cylinder surface then contacts the fabric garments during the wash cycle and causes the desired wear and abrasion of the fabric or garments. The disadvantages of this method include the time and cost of repeated resurfacing of the wash cylinder and the substantial time and energy required to achieve satisfactory stonewashing of the fabric or garments in the machine.

A disadvantage common to both prior art methods is that creases or folds of the fabric or garments contacting the pumice stones or roughened wash cylinder surface are abraded to a substantially greater degree than other portions of the fabric or garments. This causes streaking and unacceptable appearance, and may cause excessive wear including actual tearing of the fabric or garments at the crease lines. Also, different stonewashing cycles, or even a single cycle, may produce garments with widely varying appearance, nap, streaking, and wear.

In another process for stonewashing garments, taught in U.S. Pat. No. 4,575,887, a predetermined amount of pumice sand and other small-sized particle abrasive are used to abrade and wear the fabric or garments. After agitation in the wash medium containing the pumice sand and like material, the washing machine receptacle is drained and the abrasive material is trapped and separated from the drainage liquid. The filtered abrasive particles are reused in subsequent operations.

The major disadvantages of the processes taught in the '887 patent include the abrasion of the inside wall of the cylinder, the cost and time required for filtering out the pumice or abrasive particles from the wash liquid, the necessity of one or more subsequent rinse steps to remove the pumice or abrasive particles from the fabric or garments after the abrasion step, and the formation of pumice deposits in the pockets of garments such as jeans. In addition, there is constant attrition and loss of abrasive material, so that more must be added for each cycle to maintain the desired ratio of pumice-abrasive material to fabric or garments being treated (e.g., from 1-2 pounds of pumice sand per pound of fabric or garments). Wear and deterioration of the commercial washers used in the process is also significantly accelerated.

A process recently developed to process denim fabrics without subjecting them to abrasion by pumice stones or modified pumice stones is disclosed in U.S. Pat. Nos. 4,332,864 and 4,912,056, to Olson. In Olson's process, variation in local color density of fabric panels, i.e., a stonewashed look, is achieved by mechanically agitating the garments in an aqueous composition containing a cellulase enzyme which degrades the cellulose fabric and releases portions of the dye contained therein.

While Olson achieves certain advantages over the conventional pumice stone methods described above, it has not been possible to achieve a satisfactory distressed appearance of the treated garments using Olson's processes without resorting to a pumice stone treatment in addition to the treatment with cellulase. It has also been observed that garments treated by the Olson process are streaked and uneven in appearance. Cellulases are also fairly expensive to use and the Olson process consequently has certain economic disadvantages.

OBJECTS OF THE INVENTION

It is a primary object of this invention to provide a method for creating a stonewashed appearance on denim fabric and garments.

It is a related object of this invention to provide a flexible process which avoids the many disadvantages of using pumice stones or permanganate-impregnated pumice stones to create color and wear appearances on denim fabric or garments.

It is a further and related object of this invention to improve upon the cellulase-based treatment processes of the prior art.

It is a further and related object of this invention to provide an efficient, low-cost process using foamed cellulases to create a high-quality stone-washed appearance on denim fabric or garments using standard commercial washing equipment, which does not damage the fabrics or the machines in which the fabrics are processed.

SUMMARY OF THE INVENTION

The invention is in a method for the treatment of denim fabrics or garments to achieve a worn look comprising the step of contacting a plurality of denim fabrics or garments with an effective amount of a foam composition containing an effective amount of a cellulase enzyme capable of altering the color depth of the denim fabric. The garments or fabrics are vigorously tumbled so that they repeatedly contact and rub against one another.

The blow ratio of the foam (defined as volume of foam/volume of liquid in the foam) is selected to be sufficiently high so that abrasive rubbing contact between the garments or fabric is ensured. While applicants do not wish to be bound by any theory as to how the methods of the invention work, it is believed that by applying cellulase in foam rather than in an aqueous solution, the garments or fabrics are better able to contact one another during tumbling and their surfaces slidingly contact one another more intensively and extensively, thereby achieving a stone-washed appearance that is substantially improved over that achieved in the prior art cellulase method. It has also been found that the method of the invention achieves a more uniform appearance of the treated garments in that streaking of the garments is not observed as in the prior art method, that substantially less cellulase need be applied in the foam method of the invention than in the prior art method and that a pumice stone finishing step to achieve the desired appearance of the garment is not necessary.

DETAILED DESCRIPTION OF THE INVENTION

The objects of the invention are achieved in a foam method for creating a worn appearance on denim fabrics or garments. Broadly, a foam may be prepared and introduced into a tumbling machine with desized garments or fabrics, or, a foam may be created in situ in a tumbling machine containing desized garments or fabrics. The foam composition contains an effective amount of a cellulase enzyme capable of altering the color depth in the fabric or garment.

It has been found that satisfactory results are obtained if the blow ratio of the foam is broadly in the range of from 5 to 60 and that best results are obtained if the blow ratio is above 20. By maintaining the blow ratio of the foam above this value, the tumbling of the fabric or garments will take place under conditions wherein the garments slidingly contact and rub their surfaces against one another thereby creating the desirable worn look. If the blow ratio is substantially below the preferred ranges described, then the process does not achieve the advantageous results sought because, as it is believed, water acts as a lubricant between the surfaces of the tumbling garments thereby preventing solid rubbing contact between them.

In order to obtain satisfactory results, it has been found that the cellulase enzyme must be employed in broadly from 0.01 to 0.05 pounds per pound of fabric or garment. Best results are obtained when from 0.015 to 0.035 pounds of cellulase enzyme are employed per pound of fabric or garment.

Desirably the process is carried out with from 0.5 to 4.0 pounds of foam per pound of garment or fabric and best results are achieved when from 0.75 to 2.0 pounds of foam are employed per pound of garment.

It has been found that the methods of the invention can achieve satisfactory results with substantially less cellulase enzyme, per pound of garment or fabric treated, than can the prior art methods, depending on the type of fabric, machinery used and total amount of abrasion desired. As little as 50% or less of the amount of cellulase enzyme per pound of fabric or garment may be employed in the methods of the invention as compared with the prior art methods which involve cellulase enzyme and stones. Where the prior art uses 2% by weight of cellulase enzyme per weight of fabric or garment being treated, advantageous results can be obtained using the methods of the invention using as little as 1% or less by weight of cellulase enzyme per weight of fabric or garment. It has also been found that it is not necessary using the methods of the invention to use pumice stones and hence the substantial advantages over the prior art methods described above are achieved. The treated garments or fabrics have a uniform worn appearance and are not streaked as is encountered in the prior art.

In the preferred embodiments, denim garments or fabrics having a unit weight of from 6 to 16 oz per square yard are treated by the methods of invention. Lighter garments or fabrics may not be advantageously treated because their weight is insufficient to obtain the desired abrading contact as the garments or fabrics are tumbled within the washing machine. The garments or fabrics are loaded into a washing machine and from 0.5 to 4.0 pounds per pound of fabric or garment of a foam composition containing from 0.01 to 0.05 pounds, per pound of foam, of a cellulase enzyme capable of altering the color depth of the dye in the denim fabric or garment is introduced. The foam has a blow ratio of from 5 to 60. The garments or fabrics are then tumbled together so that they vigorously and repeatedly contact one another and slidingly rub against one another in the presence of the foam composition. This alters the color depth of the dyestuff in the garment and causes the desired mild abrasion of the surfaces thereof. After the tumbling step in the presence of the foam has been completed, the garments are rinsed to remove the foam composition.

The tumbling is typically carried out at a temperature of from 50° to 60° C. at which temperature the cellulase enzyme is active, and at a pH of from 4 to 5, preferably from 4.25 to 4.75 when using acid based cellulase enzyme. When using neutral cellulase the pH range should be 6–7, with best results obtained at about 6.5. Satisfactory results are achieved after tumbling the fabrics or garments for from 5 to 60 minutes, with the best results for from 15 to 30 minutes.

The foam compositions of the invention may be prepared by methods known in the art. The several components are described below.

Cellulase Enzyme

Appropriate cellulase enzymes are known. For example, cellulase enzymes appropriate for use in the instant process are disclosed, although for use in a different process, in references discussed above. For example, in U.S. Pat. Nos. 4,832,864 and 4,912,046, to Olson, there is a disclosure of cellulase enzymes which would be suitable for use in the instant invention.

Foaming Agents

Acceptable foaming agents include, for example, exthoxylated alcohols, ethoxylated alkyl phenols, ethylene oxide and propylene oxide block polymers, carboxylic acid amides, sulfated amides, amine oxides, ethoxylated amines, sulfated, phosphated, or carboxylated alcohol ethoxylates, sulfated phosphated, or carboxylated alkyphenol ethoxylates, sulphated, phosphated, carboxylated or sulfonated alcohols, and alkyl carboxylates.

Foam Stabilizers

Acceptable foam stabilizers include natural gums such as locust or guar gums, the carboxymethylated or ethoxylated derivatives of starch and cellulose, and synthetic polymers such as polyacrylic acid derivatives.

The invention is further described in the following Examples:

Example I

Eight pounds of new denim jeans and 15 gallons of 160° F. water containing 2% (by dry weight of the denim jeans) of an amylase enzyme mixture containing minor amounts of phosphate esters, ethoxylated alcohols and chelating agents were placed into a Milnor 35 lb capacity washing machine. The contents were agitated for 10 minutes, then drained. The machine was then filled with 15 gallons of 120° F. water, and the contents were agitated for 2 minutes, then drained. Next, the machine was filled with 15 gallons of 150° F. of water containing 1% (by dry-weight of the denim jeans) acetic acid (56%). The contents were agitated for 2 minutes, then drained. The jeans were then extracted in the machine for 1.5 minutes. The contents of the machine (denim jeans only) were agitated for 1 minute.

An enzyme foam in accordance with the subject invention was then applied to the jeans in the machine. 0.75 lbs of foam was added for every 1 lb of jeans. The particular foam mix used contained 0.15% of a polyacrylic acid derivative, 3% sodium lauryl sulfate, 0.8% cellulase enzyme and 93.6% water buffered to a pH of 4.5–5.0. The foam blow ratio was approximately 35:1. The foam and jeans were agitated for 15 minutes at a rate of 2 lbs of foam per minute. The machine was then filled with 15 gallons of 120° F. water and agitated for 2 minutes. The aqueous solution was drained, and the machine was again filled with 15 gallons of 120° F. water and agitated for 2 minutes before draining again. The machine was then filled with 15 gallons of 160° F. water containing 0.5% of an amine condensate mixture containing a minor amount of a fatty acid soap, 2% sodium perborate and 0.5% of a fluorescent brightener, all measured as a percentage of the dry-weight of the jeans being treated. The contents of machine then agitated for 6 minutes. The aqueous contents were then drained and the machine refilled with 15 gallons of 120° F. water. The contents were agitated for 2 minutes, then drained. The machine was filled again with 15 gallons of 120° F. water, the contents agitated for 2 minutes, then drained. Twelve gallons of 100° F. water containing 0.3% of a fatty amide condensate and 0.3% fatty amine ethoxylate (percentage of the dry weight of the jeans) were then added to machine and the contents agitated for 3 minutes. The aqueous solution was drained off and the jeans were extracted for 1.5 minutes, then removed from the machine and dried.

Example II

Eight pounds of new denim jeans and 15 gallons of 160° F. water containing 2% (by dry-weight of the jeans) of an amylase enzyme mixture containing minor amounts of phosphate esters, ethoxylated alcohols and chelating agents were placed into a Milnor 35 lb capacity washing machine. The aqueous contents were agitated for 10 minutes, then drained. The machine was then filled with 15 gallons of 120° F. water, and the contents agitated for 2 minutes. The aqueous contents were then drained, and the machine was refilled with 15 gallons of 150° F. water. The contents of the machine were agitated for 1 minute, then drained. The jeans were then extracted in the machine for 1.5 minutes. The contents of the machine were then agitated for 1.5 minutes with no aqueous solution. A foam in accordance with the present invention was then applied to the jeans as the machine agitated at a rate of 2 lbs of foam per minute. 0.75 lbs of foam was added for every 1 lb of dry jean weight. The foam blow ratio was approximately 42:1. The foam contained 5% foam stabilizer, 1.67% cellulase enzyme, and 93.33% water. Additionally, the foam was adjusted with citric acid to a pH of 3.5. The foam and jeans were agitated for 15 minutes. 15 gallons of 120° water were then added, and the contents agitated for 2 minutes. The aqueous solution was then drained and the machine was again filled with 15 gallons of 120° F. water and agitated for 2 minutes before draining. 15 gallons of 160° F. water containing 0.5% of an amine condensate mixture containing a minor amount of a fatty acid soap, 2% sodium perborate and 0.5% of a fluorescent brightener, all measured as a percentage of the dry-weight of the jeans being treated were then added. The contents were agitated for 5 minutes, then drained, and the machine was refilled with 15 gallons of 120° F. water. After draining, the machine was filled with 15 gallons of 120° F. water, agitated for 2 minutes, then drained. Twelve gallons of 100° F. water containing 0.3% of a fatty amide condensate and 0.3% fatty amine ethoxylate (percentage of the dry weight of the jeans) were then added, and the contents agitated for 3 minutes. The aqueous solution was then drained, and the jeans were extracted for 15 minutes. The jeans were then removed from machine and dried.

The terms and expression which have been employed are used as terms of description and not of limitation and there is no intention in the use of such terms and expressions or excluding any equivalent of the features shown and described or portions thereof, it being recognized that various modifications are possible within the scope of the invention.

What is claimed is:

1. A method for the treatment of colored denim fabrics or garments to achieve a worn look comprising the step of contacting a plurality of denim fabrics or garments with from about 0.5 to 4.0 pounds of a foam composition per pound of fabrics or garments, which foam composition contains from about 0.015 to 0.035 pounds of cellulase enzyme, per pound of fabrics or garments, which cellulase enzyme is capable of altering the color depth in said fabrics or garments, and vigorously tumbling said fabrics or garments so that they repeatedly contact and rub against one another, said foam composition having a blow ratio of from about 5 to 60, which ratio is sufficiently high so that abrasive rubbing contact between the fabrics or garments is ensured.

2. A method as recited in claim 1, wherein said fabrics or garments have a weight of from 6 to 16 ounces per square yard.

3. A method as recited in claim 1, wherein the amount of foam is from 0.75 to 2.0 pounds per pound of fabrics or garments.

4. A method as recited in claim 1, wherein the blow ratio of said foam is from 20 to 60.

5. A method for the treatment of colored denim fabrics or garments to obtain a worn or distressed appearance comprising the step of contacting denim fabrics or garments having a weight of 6 to 16 ounces per square yard with from 0.5 to 4.0 pounds of a foam composition, per pound of fabrics or garments, which foam composition contains from about 0.015 to 0.035 pounds of a cellulase enzyme, per pound of fabrics or garments, which enzyme is capable of altering the color depth of dye in said denim fabrics or garments, said foam composition having a blow ratio of from 5 to 60, and vigorously tumbling said denim fabrics or garments together with said foam composition for a period of from 5 to 60 minutes so that they repeatedly contact and rub against one another, and thereby obtaining a worn or distressed appearance of said denim fabrics or garments.

6. A method for the treatment of colored denim fabrics or garments to achieve a worn or distressed look comprising the steps of:

(a) loading a plurality of denim fabrics or garments, wherein said denim weighs from 6 to 16 ounces per square yard, into a washing machine;

(b) introducing from 0.5 to 4.0 pounds of a foam composition per pound of fabrics or garments which foam composition contains cellulase enzyme in the amount of from 0.01 to 0.05 pounds per pound of fabrics or garments, which enzyme is capable of altering the color depth of dye in said denim fabrics or garments, said foam composition having a blow ratio of from 5 to 60;

(c) tumbling said plurality of fabrics or garments together so that they repeatedly contact and rub against one another in the presence of said foam composition, thereby altering the color depth of the dye in said fabrics or garments and causing mild abrasion of the surfaces thereof; and (d) rinsing said plurality of fabrics or garments to remove said foam composition.

7. A method as recited in claim 6 wherein the amount of enzyme is from 0.015 to 0.035 pounds per pound of fabrics or garments.

8. A stone-free method for the treatment of colored denim fabrics or garments to achieve a worn or distressed look comprising contacting a plurality of denim fabrics or garments with a foam-composition, wherein the amount of foam is from 0.5 to 4.0 pounds of foam, per pound of fabrics or garments, which composition contains cellulase enzyme in the amount of from 0.01 to 0.05 pounds, per pound of fabrics or garments, which enzyme is capable of altering the color depth in said fabrics or garments, and vigorously tumbling said fabrics or garments so that they repeatedly contact and rub against one another, said foam having a blow ratio of from 5 to 60, so that abrasive rubbing contact between the fabrics or garments is ensured.

9. A method as recited in claim 8 wherein said fabrics or garments weigh from 6 to 16 ounces per square yard.

10. A method as recited in claim 8 wherein the amount of foam is from 0.75 to 2.0 pounds per pound of fabrics or garments.

11. A method as recited in claim 8 wherein the amount of enzyme is from 0.015 to 0.035 pounds per pound of fabrics or garments.

12. A stone-free method for the treatment of colored denim fabrics or garments to obtain a worn or distressed appearance comprising the step of contacting denim fabrics or garments having a weight of 6 to 16 ounces per square yard with from about 0.5 to 4.0 pounds of a foam composition, per pound of fabrics or garments, which foam composition contains from about 0.01 to 0.05 pounds of a cellulase enzyme, per pound of fabrics or garments, which enzyme is capable of altering the color depth of dye in said fabrics or garments, said foam composition having a blow ratio from 5 to 60, and vigorously tumbling said fabrics or garments together with said foam for a period of from 5 to 60 minutes so that they repeatedly contact and rub against one another, thereby obtaining a worn or distressed appearance of said fabrics or garments.

13. A stone-free method for the treatment of colored denim fabrics or garments to achieve a worn or distressed look comprising the steps of:

(a) loading a plurality of denim fabrics or garments, weighing from 6 to 16 ounces per square yard, into a washing machine;

(b) introducing from 0.5 to 4.0 pounds of a foam composition per pound of fabrics or garments, which foam composition contains cellulase enzyme in the amount of from 0.01 to 0.05 pounds per pound of fabrics or garments, which enzyme is capable of altering the color depth of dye in said denim fabrics or garment, said foam composition having a blow ratio from 5 to 60;

(c) tumbling said plurality of fabrics or garments together so that they repeatedly contact and rub against one another in the presence of said foam composition, thereby altering the color depth of the dye in said fabrics or garments and causing mild abrasion of the surfaces thereof; and (d) rinsing said plurality of fabrics or garments to remove said foam composition.

14. A method as recited in claim 13 wherein the amount of enzyme is from 0.015 to 0.035 pounds per pound of fabrics or garments.

* * * * *